May 2, 1950  C. G. BROSTROM  2,505,880
WOOD VENEER EDGE SCARFING MACHINE
Filed July 13, 1944  4 Sheets-Sheet 1

*Inventor*
Charles G. Brostrom
By his Attorney

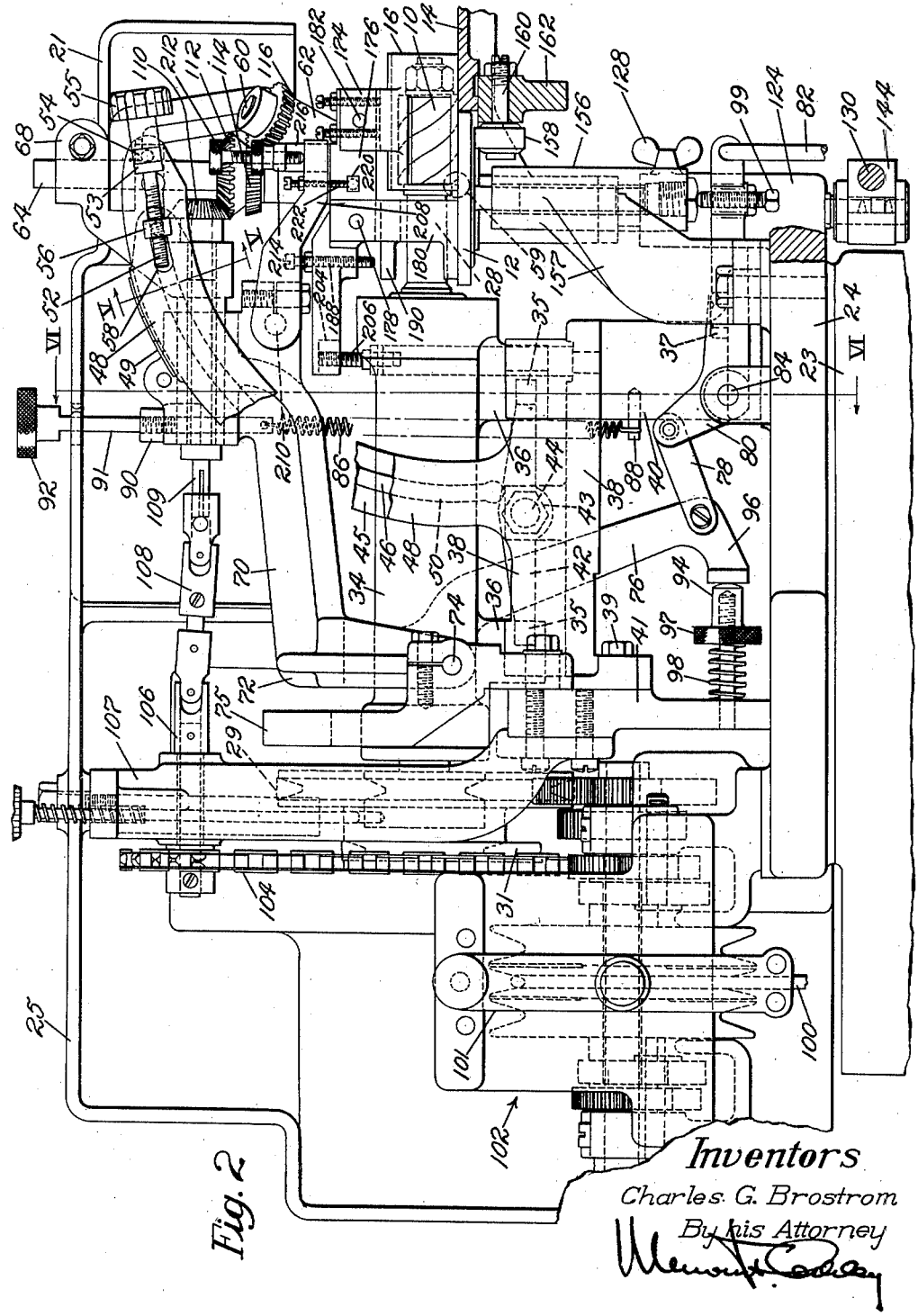

May 2, 1950     C. G. BROSTROM     2,505,880
WOOD VENEER EDGE SCARFING MACHINE
Filed July 13, 1944     4 Sheets-Sheet 3
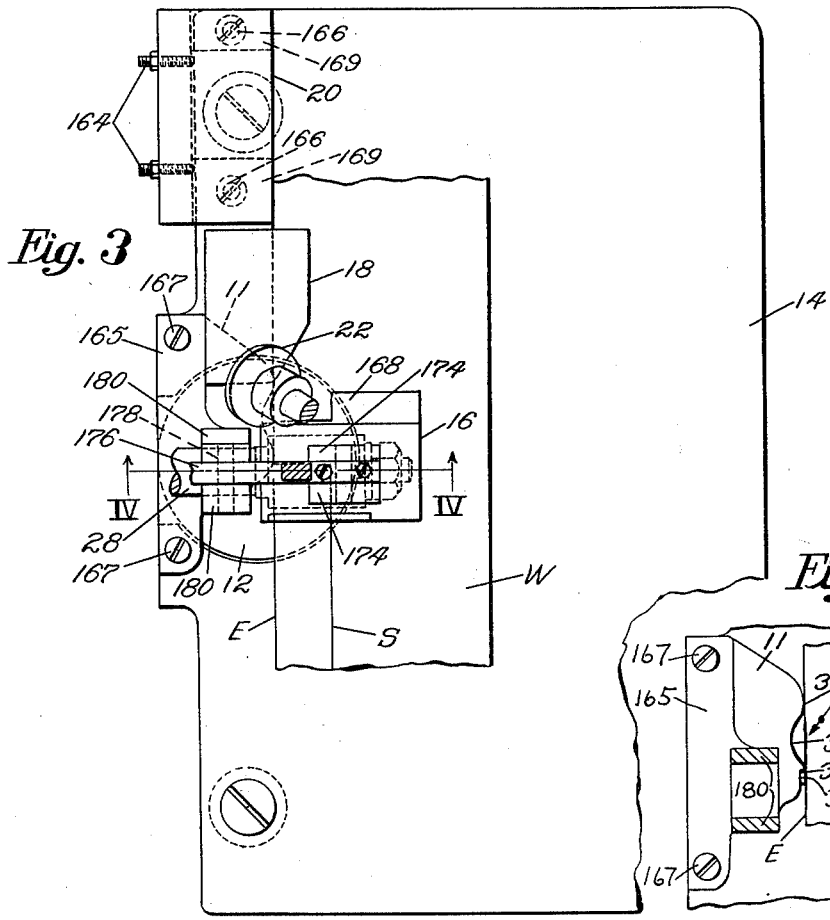
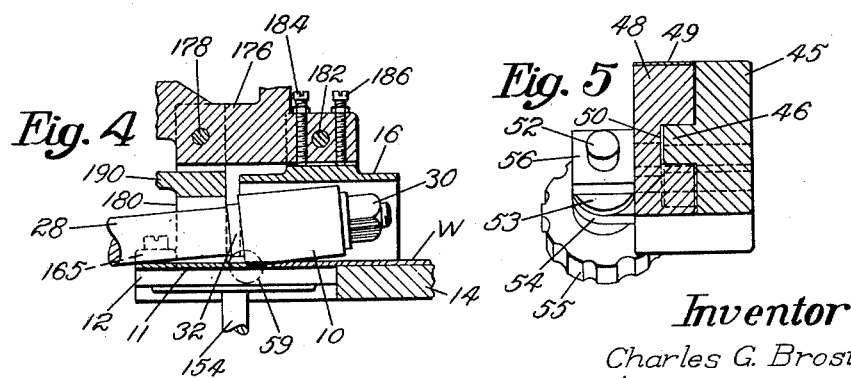
Inventor
Charles G. Brostrom
By his Attorney May 2, 1950     C. G. BROSTROM     2,505,880
WOOD VENEER EDGE SCARFING MACHINE Filed July 13, 1944     4 Sheets-Sheet 4

Inventor
Charles G. Brostrom
By his Attorney

Patented May 2, 1950

2,505,880

UNITED STATES PATENT OFFICE 2,505,880

WOOD VENEER EDGE SCARFING MACHINE

Charles G. Brostrom, Lynn, Mass., assignor to United Shoe Machinery Corporation, Flemington, N. J., a corporation of New Jersey Application July 13, 1944, Serial No. 544,757

3 Claims. (Cl. 144—117)

This invention relates to scarfing machines and is herein disclosed as embodied in a machine for beveling the margins of pieces of veneer which are to be made into plyboard. The veneer is usually supplied in long, narrow strips about one-sixteenth of an inch thick which must be cemented together with margins overlapping to form wide sheets, the purpose of the scarfing operation being to prepare the margins of the veneer strips for such attachment to one another. After the veneer has thus been formed into sheets, the sheets are cemented face to face, with the grain in adjacent sheets running in different directions, the thickness of the resulting plyboard depending upon the number of layers of veneer sheets.

For high grade work it is necessary to scarf the margin of the veneer to almost a feather edge, leaving only a definite minimum thickness of material at the edge to avoid having the edge break irregularly. The surface of the scarf should be smooth and uniform. The thickness of the material operated upon sometimes makes provision for changing the angle of bevel of the scarf desirable; for relatively thick material the angle must be steeper than for thin material, to keep the width of the scarf within the length of the scarfing tool. Provision for adjustment of the angle of scarf is desirable also to meet the varying requirements of different factories.

It is an object of the present invention to provide a scarfing machine capable of operating in accordance with the requirements above outlined. To this end, the machine herein disclosed is provided with a rotary scarfing tool which may be set at various angles to obtain the desired degree of bevel. The illustrative machine is further provided with a heightwise adjustable work table, a feed control disk, an edge gage, and an edge guide, all organized to cooperate with the scarfing tool.

Other features and objects of the invention will be apparent from the accompanying drawing and the following description wherein an illustrative embodiment of the invention is disclosed.

In the drawing,

Fig. 2 is a side elevation of the head of the machine;

Fig. 3 is a plan view of the work-engaging instrumentalities;

Fig. 4 is a section taken on the line IV—IV of Fig. 3;

Fig. 5 is a section taken on the line V—V of Fig. 2;

Fig. 9 is a detail plan view of the work-engaging portion of the edge gage.

Figure 1:
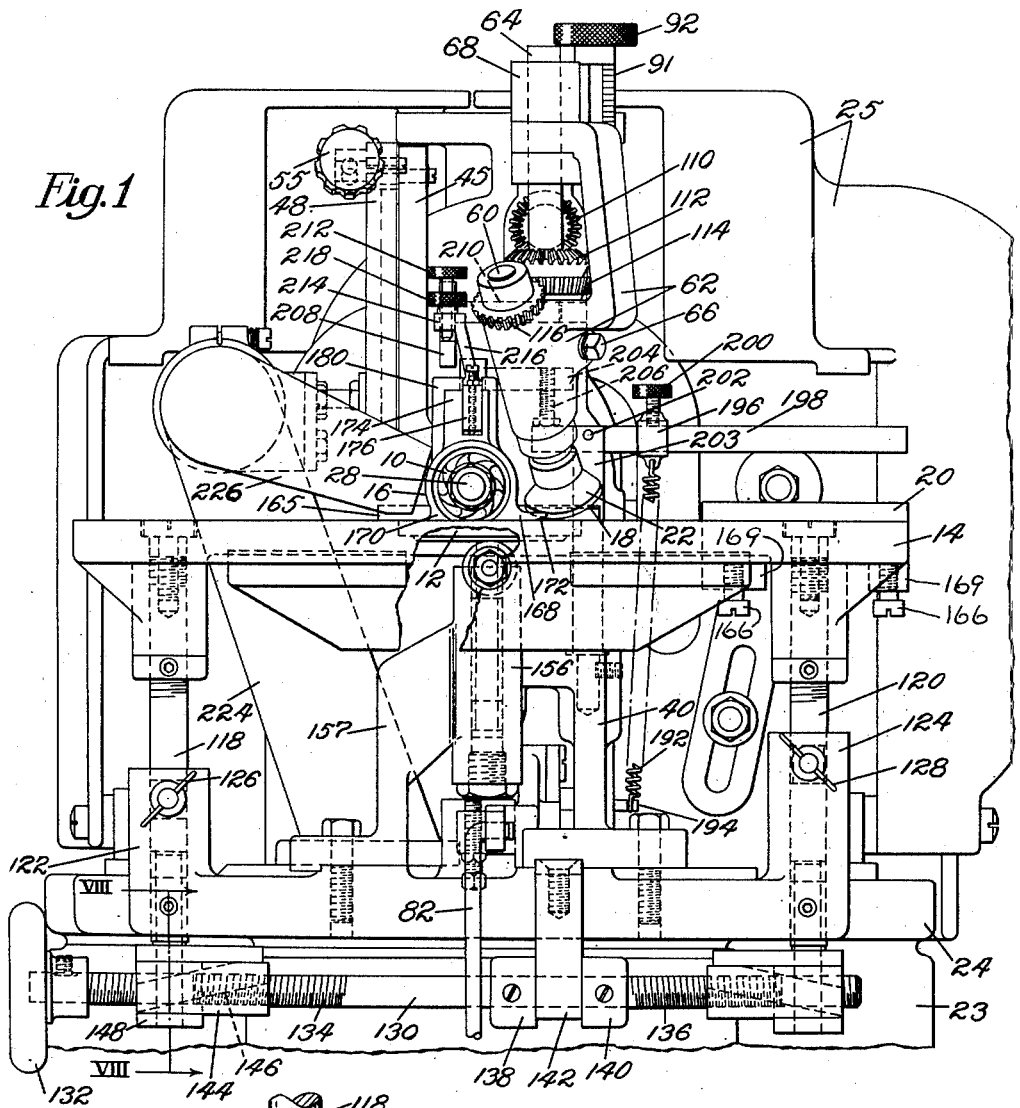
Fig. 1 is a front elevation of the head of an illustrative machine embodying the invention.

The work-engaging instrumentalities of the illustrated machine consists of a driven rotary scarfing tool 10 (Figs. 1 and 7), an edge gage 11 (Fig. 9), a freely rotatable circular work table 12 (Figs. 3 and 4), a stationary work table 14 partially surrounding the work table 12, a holddown or double presser foot 16, an overhanging guide 18, an edge guide 20, and a driven rotary feed disk 22. The rigid supporting structure (Figs. 1, 2 and 6) comprises a hollow frame or housing 23 surmounted by a platform 24, and a head 25 carried by the platform 24. The head 25 has a vertically split forward section 21 hinged to open about vertical pintles (not shown) on each side.

The scarfing tool 10 (Fig. 7) is cylindrical and has a plurality of cutting teeth 26 disposed helically around its periphery and separated from each other by clearance grooves. The tips of these teeth are not backed away, but form cylindrical lands 27 about one thirty-second of an inch in width, all the lands lying in the surface of a single boundary cylinder which is coaxial with the tool. The tool has an axial bore which fits over the reduced end of a shaft 28 (Fig. 4). A nut 30 threaded upon the end of the shaft 28 clamps the tool 10 against a collar 32 formed on the shaft 28.

The shaft 28 is journaled in ball bearings in a bearing support 34 (Figs. 2 and 6) and is held against end thrust by another set of ball bearings in said support. The shaft 28 is driven at high speed through belts 29 (Fig. 6) and 31 (Fig. 2) from any suitable source of power. The bearing support 34 is stationary during the operation of the tool upon the work, but it may be adjusted angularly to vary the slope of the scarf to be formed upon the work. A pair of co-planar guide plates 36 depending from and integral with the bearing support 34 engage a guide flange 38 formed in a bracket 40 secured by a screw 37 directly to the platform 24 and also by a screw 39 to an upright flange 41 on the platform. A clamping bar 42 has finished surfaces 35 adjacent to its ends for bearing against the plates 36 to press them against the flange 38. Clamping pressure for the bar 42 is obtained by a nut 43 threaded upon one end of a post 44 and bearing against the bar 42. The post 44 extends loosely through a hole in the bar 42; it extends also between the plates 36 and has its opposite end secured in the flange 38. In order to provide for angular adjustment of the tool 10 to vary the slope of the scarf formed on the work, the bearing support 34 has an upwardly extending sector 45 upon which is an arcuate tongue 46. An upstanding stationary guide sector 48 of the bracket 40 has an arcuate groove 50 in which the tongue 46 is guided for angular adjustment of the bearing support. The stationary sector 48 carries a plate 49 (Fig. 5) bearing suitable scale markings to register with an index mark on the movable sector 45. A tangent screw 52 (Figs. 2 and 5) facilitates adjustment of the tongue 46 in the groove 50. This screw is held from endwise movement by an eye 54 which is swiveled in the sector 48 and which surrounds the shank of the screw 52. The eye 54 holds the screw 52 against endwise movement by engaging on one side a collar 53 on the screw 52 and on the other side the hub of a hand wheel 55 by which the screw is turned. The screw is threaded through an eye 56 which is swiveled on the tongue 46 and which has a shank extending through an opening 58 in the sector 48. It is evident that when the clamping nut 43 is loosened the screw 52 may be turned to effect a fine adjustment of the angular position of the tool 10. The axis (indicated on Figs. 2 and 4 as the center of a reference circle 59) about which this adjustment takes place passes through the lowest point of the tool 10; it is parallel to the surfaces of the work tables 12 and 14 and tangent to the boundary circle of the lower end of the tool. The tool 10 may therefore be adjusted to any desired slope without varying the height of its lowest point above the work table 12. This height, in the illustrated machine, is six one-thousandths of an inch. Since the axis of the guide sector 48 is fixed, and since the diameter of the tool 10 is changed when the tool is ground to sharpen it, the exact height of the lowest point of the tool above the work table 12 is obtained by a fine heightwise adjustment (later to be described) of the work tables 12 and 14. The diameter of the shaft 28 is enough less than that of the tool 10 to provide clearance of the shaft above the edge of the work table for all angles of adjustment of the tool. In Fig. 2 the machine is shown, for convenience, with the tool 10 adjusted to a zero angle of slope; in Fig. 4 the tool is shown at about the usual working angle.

Figure 6:
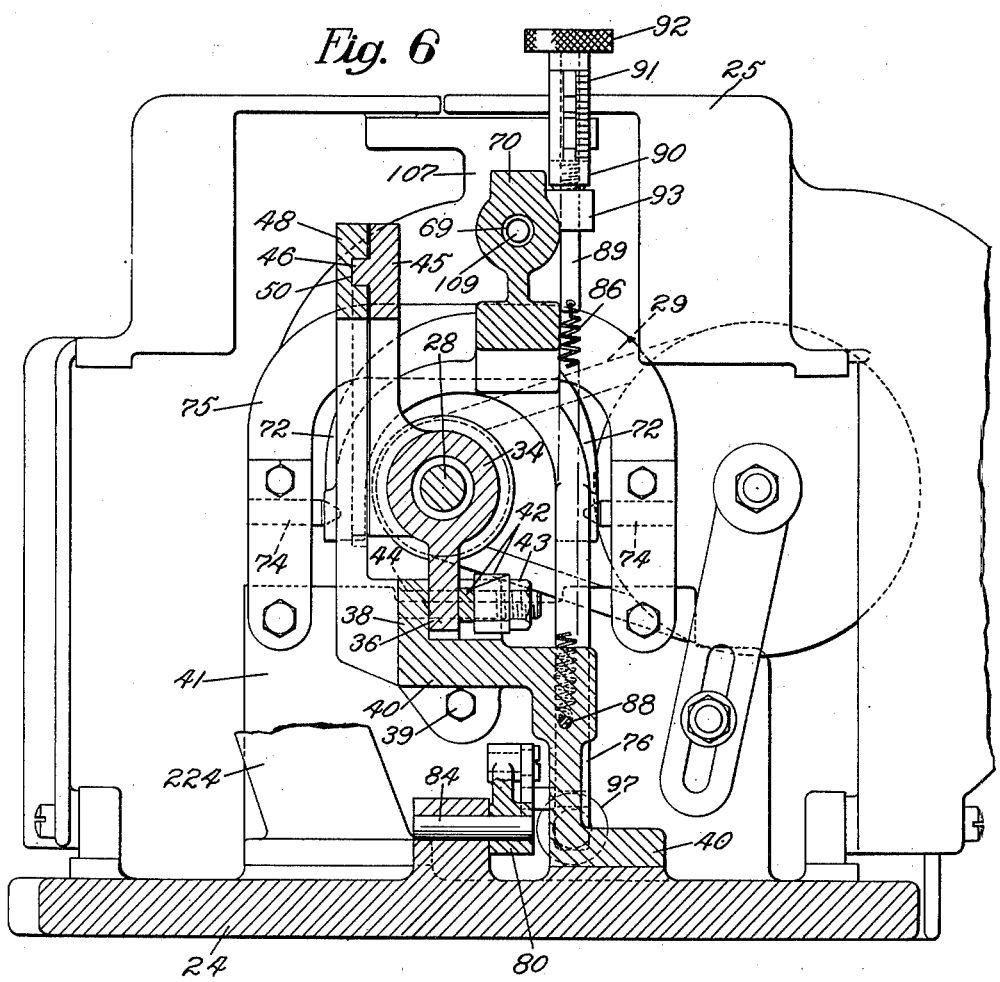
Fig. 6 is a section taken on the line VI—VI of Fig. 2.
Figure 7:
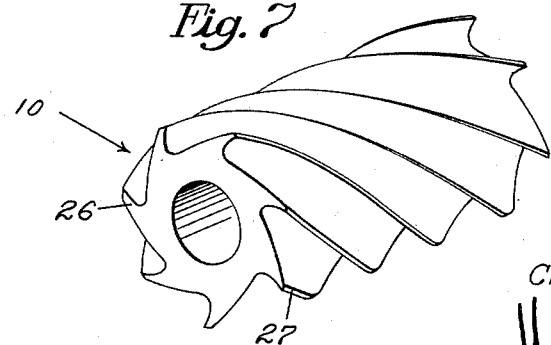
Fig. 7 is an angular view of the scarfing tool.

The feed disk 22 is faced with rubber to insure a soft frictional grip upon the work. This feed disk is mounted upon the lower end of an inclined shaft 60 (Figs. 1 and 2) which is journaled in a bracket 62. A vertical post 64 supports the bracket 62 in any desired position of angular adjustment about the axis of the post, the bracket having a split portion which may be clamped to the post by a binding screw 66 (Fig. 1). The post 64 is clamped securely in a bracket 68 which, in turn, is fixed upon one end of a sleeve 69 (Fig. 6). The opposite end of the sleeve 69 is fixed in a lever 70. A yoke 72 (Figs. 2 and 6) formed on the lever 70 partially embraces the bearing support 34 and is fulcrumed upon a pair of transverse trunnion pins 74 secured in a stationary yoke-shaped bracket 75 fixed upon the flange 41. A downwardly extending arm 76 of the lever 70 is connected through a link 78 to one end of a lever 80. A treadle rod 82 is connected to the opposite end of the lever 80 and operates to swing the lever about a fulcrum pin 84 secured in a lug extending upwardly from the platform 24. The feed disk 22 is urged downwardly by a spring 86 the lower end of which is anchored to a pin 88 secured in the bracket 40 and the upper end of which is secured to the lower end of a screw 89. The upper end of the screw 89 is threaded into a nut 90 having an elongated shank 91 and a knurled head 92. The nut 90 bears downwardly against a lug 93 extending from the lever 70. The tension of the spring 86 may be varied by turning the head 92. For convenience in making this adjustment, the shank 91 is slotted longitudinally to expose the end of the screw 89, and graduations are marked on the shank to gage the position of the end of the screw. In order to limit downward movement of the feed disk 22 under the influence of the spring 86 to prevent contact between the feed disk and the rotary table 12 when there is no work piece below the feed disk, there is provided a stop 94 (Fig. 2) which is engaged by an extension 96 from the lower end of the arm 76. The stop 94 is threaded into the stationary flange 41 for purposes of adjustment and is provided with a knurled head 97 to facilitate turning. A compression spring 98 holds the stop 94 in any desired position of adjustment. In order to avoid changing the normal height of the treadle every time the stop 94 is adjusted, the link 78 is provided with a lost-motion slot to accommodate the pivot pin connecting it to the arm 76. The height of the treadle is determined, not by the stop 94, but by a stop screw 99 threaded through the lever 80 and bearing against a plug on the bottom of a boss 156 later to be described. A spring (not shown) holds the treadle in its up position. It is evident from the foregoing description that depression of the treadle will operate through the rod 82 to raise the feed disk 22 to facilitate the introduction of a work piece. The mounting of the feed disk 22 is similar to the mounting of the feed disk 130 disclosed in United States Letters Patent No. 2,296,836, granted September 29, 1942, upon my application.

The feed disk 22 is driven through mechanism comprising a belt 100 (Fig. 2), variable speed gearing 102, a sprocket chain 104, a shaft 106 journaled in a bracket 107 secured to the stationary flange 41, a universally jointed extensible connection 108, a shaft 109 journaled in the sleeve 69, a bevel gear 110 on the outer end of the shaft 109, a pair of integral bevel gears 112 and 114 loose on the post 64, and a bevel gear 116 secured on the shaft 60.

The variable speed gearing 102 consists of three coaxial pulleys. The middle pulley is keyed upon a shaft; the end pulleys are carried by sleeves freely rotatable upon the shaft; one of the end pulleys is geared to the pulley shaft (through gears on a parallel countershaft) to drive the pulley shaft slower than the middle pulley; the other end pulley is similarly geared to drive the pulley shaft faster than the middle pulley. The belt 100 may be transferred from one pulley to another by an ordinary belt shifter 101. The pulley shaft is geared through reduction gearing to a sprocket wheel that drives the chain 104.

The stationary work table 14 (Figs. 1 and 2) is rigidly secured to the upper ends of a pair of vertical rods 118 and 120. These rods are slidable heightwise for purposes of adjustment in guideways formed in bosses 122 and 124 on the platform 24. In Fig. 2 the showing of the nearer boss 122 has been omitted to avoid obscuring the parts back of it. The rods may be secured in any desired position of heightwise adjustment by winged clamping screws 126 and 128 threaded through the respective guideways and bearing upon reduced portions of the rods.

Figure 8:
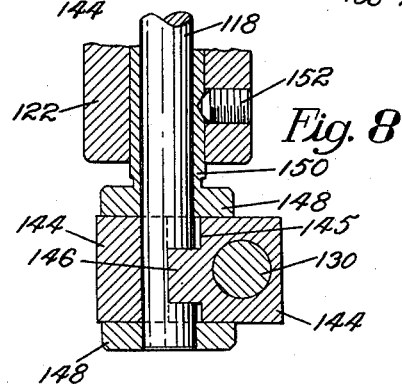
Fig. 8 is a section taken on the line VIII—VIII of Fig. 1.

Heightwise adjustment of the table 14 is effected by a shaft 130 (Figs. 1 and 8) which is turned through a hand wheel 132 and which has a pair of oppositely threaded portions 134 and 136 adjacent to its ends. Secured upon the shaft 130 in spaced relation to each other are a pair of collars 138 and 140. Embracing the shaft 130 between the collars 138 and 140 and secured to the platform 24 is a yoke 142 which serves to hold the shaft 130 against longitudinal movement. Threaded upon the portion 134 is a slide block 144 having a tongue 146 which extends into a corresponding groove in the lower end portion of the rod 118. The block 144 has a slot 145 to accommodate the rod 118. The left-hand end (from the view-point of Fig. 1) of the slot 145 is open; the right-hand end is closed to unite the portions of the block on the opposite sides of the slot. The tongue 146 extends into the slot 145. The tongue and groove have a heightwise inclination whereby movement of the block 144 in the direction of the axis of the shaft 130 will raise or lower the rod 118. The block 144 is guided for such movement by a guideway formed in a block 148 which is integral with a bushing 150 surrounding the rod 118 and secured in the guideway 122 by a binding screw 152. The portion of the guideway block 148 which is below the slide block 144 is united to the upper portion by vertical webs (not shown) positioned on the right and left (from the view-point of Fig. 1) of the rod 118. The arrangements for heightwise adjustment of the rod 120 are similar to those already described for the rod 118 except that the tongue-and-groove connection for the rod 120 has an opposite inclination. It is evident from the construction so far described that turning of the hand wheel 132 will serve to raise and lower the rods 118 and 120 to an equal extent. After the desired heightwise adjustment of the table 14 is thus obtained, the clamping screws 126 and 128 may be tightened to hold the table in this adjusted position.

The circular, freely rotatable work table 12 (Figs. 1, 2 and 4) is carried upon the end of a vertical shaft 154 which is journaled in, and also freely slidable in, a bearing in the boss 156 (previously mentioned in connection with the stop screw 99). The boss is a part of a bracket 157 which is secured upon the platform 24. Heightwise support for the work table 12 is provided in the form of a roll 158 engaging the under surface of the table at a point directly beneath the mid portion of the scarfing tool 10. The roll 158 is rotatably mounted by a ball bearing on a pin 160 secured in a bracket 162 which is attached to and depends from the work table 14. It is evident that heightwise adjustment of the work table 14 will automatically effect an equal heightwise adjustment of the work table 12. To provide for a slight heightwise adjustment of the rotary work table 12 relatively to the stationary work table 14, the pin 160 has an eccentric shank (the eccentricity is too slight to be shown) which may be clamped in any desired position of rotary adjustment in the bracket 162. The work table 14 practically surrounds the work table 12 with a minimum clearance space to permit free turning of the work table 12.

The edge gage 11 is shown in Figs. 3, 4 and 9 in relation to a work piece W having an edge E, and upon which is being formed a scarf extending from the edge E to a line S. This edge gage is formed upon a bridge 165 (notched to clear the shaft 28) which extends over the rotary work table 12 and which is secured at its ends by screws 167 to the stationary work table 14. The edge gage has a rounded work-engaging portion 300 immediately in advance of the point at which the feed disk 22 engages the work and another rounded work-engaging portion 302 directly under the center-line of the tool 10. The point of contact of the feed disk with the work is shown on Fig. 9; the direction of the force applied to the work by the feed disk is indicated by an arrow. Between the work-engaging portions 300 and 302 the edge gage recedes (at 304) to clear the feed disk 22. The working surface of the tool 10 extends outside the edge E of the work piece (as positioned by the edge gage) by about one thirty-second of an inch. Since the lowest point of the tool 10 is, as has already been mentioned, only six one-thousandths of an inch above the work table 12, the tip of the work-engaging portion 302 is made slightly thinner than six one-thousandths of an inch to clear the tool and also to clear the rotary work table 12. Such reduction in the thickness of this portion of the edge gage leaves a shoulder 306 which is slightly over one-thirty-second of an inch from the tip to clear the end of the tool. Since the height of the lowest point of the tool is .006 of an inch, the height of the upward sloping tool 10 at the edge E will be slightly greater, and the scarfed edge E will therefore have a substantial thickness which is desirable to avoid raggedness resulting from breaking.

The edge guide 20 (Figs. 1 and 3) is secured upon the work table 14 in a position to engage the edge of a work piece which is being fed to the tool 10. A fine adjustment of the edge guide may be obtained by a pair of screws 164 threaded through a depending flange on the edge guide and bearing against the edge of the table 14. After the desired adjustment has been obtained, the edge guide may be clamped to the work table by screws 166 threaded through underhanging flanges 169 of the edge guide and bearing against the under surface of the work table 14. For a long piece of work having a straight edge, the edge guide 20 and the edge gage 11 cooperate in determining the line of feed, the guide 20 serving to prevent undesired pivoting of the work about the gage 11. However, when, as is sometimes the case, the work piece has a curved or irregular edge, it may be desirable to remove the edge guide 20 and rely upon the edge gage 11 alone.

The overhanging guide 18 (Figs. 1 and 3) is carried by the bridge 165; it consists of a horizontal piece of thin sheet metal spot welded to the bridge. It extends loosely over the work piece to prevent heightwise vibration.

The holddown 16 (Figs. 1, 3 and 4) is of a generally cylindrical shape with open ends. It partially surrounds the tool 10, having a longitudinal opening through which the tool has access to the work. This holddown is longer than the tool, extending beyond both ends of the tool. Adjacent to the longitudinal opening above mentioned, the holddown is formed into a presser foot 168 (Figs. 1 and 3) which engages the work in advance of the tool and a presser foot 170 which engages the work to the rear of the tool. The presser foot 168 has an upward bevel 172 which enables it to ride up upon the leading edge of the advancing work piece. Extending upwardly from the holddown 16 is a lug 174

(Figs. 1 and 2) in which is formed a slot. Extending into this slot is one end of a lever 176 which is fulcrumed upon a pin 178 (see also Fig. 4) secured in a slotted upward extension 180 of the bridge 165. The holddown 16 is pivotally mounted for free swinging movement about a transverse pin 182 secured in the lug 174 and passing through a bore in the lever 176. Such swinging movement of the holddown is limited by a pair of adjustable stop screws 184 and 186 threaded through the lever 176 on opposite sides of the pin 182 and having their ends engageable with the base of the slot formed in the lug 174. Upward movement of the holddown 16, to prevent damage to the tool 10, is limited by a stop screw 188 threaded through the lever 176 and having its lower end engageable with a lug 190 on the extension 180. The pressure which the holddown 16 exerts upon a work piece is derived from a spring 192 (Fig. 1) having its lower end anchored to a pin 194 secured in the bracket 40 and having its upper end attached to a block 196 which is slidable for purposes of adjustment along a bar 198. The block 196 may be secured in any desired position of adjustment along the bar 198 by a knurled binding screw 200. The bar 198 is fulcrumed upon a pin 202 secured in a post 203 mounted on the bracket 40. The lever 176 has a transverse extension 204 into which is threaded an abutment screw 206. The head of the screw 206 is engageable with the bar 198. From the construction as so far described it is evident that the tension of the spring 192 tends to raise the abutment screw 206 and swing the lever 176 in a clockwise direction as viewed in Fig. 2, thereby urging the presser feet 168 and 170 against the work piece. It will be observed that while the holddown 16 is permitted a limited free swinging movement in the vertical axial plane of the tool 10, the slot formed in the lug 174 fits closely enough about the lever 176 to prevent transverse swinging movement of the holddown.

The holddown 16 is held up off the work tables 12 and 14 when no work piece is under it, and is also raised to facilitate the introduction of a work piece, by a bracket 208 (Figs. 1 and 2) rigidly mounted upon a transverse pin 210 in the lever 70 and forming, in effect, an extension of the lever 70. The upper surface of the bracket 208 engages the lower end of a screw 212 threaded through a boss 214 on an arm 216 extending upwardly from the lever 176. The clearance of the holddown 16 above the work tables 12 and 14 is determined by adjustment of the screw 212 after the screw 94 has been turned to adjust the clearance of the feed disk 22. A lock nut 218 holds the screw 212 in adjusted position. Depression of the treadle not only raises the feed disk 22, but it also, acting through the bracket 208, raises the holddown 16.

Extending laterally from the lever 176 is a lug 220 (Fig. 2) engageable with the lower end of a screw 222 threaded through the bracket 208. After the trailing end of a work piece has passed out from under the feed disk 22, the feed disk will drop until the screw 222 bears down on the lug 220. The force of the spring 86 is thus added to that of the spring 192 in urging the holddown 16 against the work piece. As will be explained later, this arrangement provides for control of the feed of the work piece at the trailing end of the work piece.

In order to provide for the disposal of dust and chips resulting from the operation of the tool, the machine has a stationary conduit 224 (Figs. 1 and 6) connected to the usual factory suction system or to a suitable blower. Swiveled upon the upper end of the conduit 224 is a pipe 226 the open end of which is in register, allowing for clearance, with an opening in the wall of the holddown 16. All the dust and chips which are formed within the holddown 16 are thus carried off through the pipe 226 and the conduit 224. When access to the tool 10 is desired, the pipe 226 may be swung upwardly out of the way about its swivel connection with the conduit 224.

In operating the machine, the treadle is first depressed to raise the feed disk 22. The work piece is then slid by hand along the work table 14 against the edge guide 20 until the leading portion of the work piece is under the feed disk 22 and against the work-engaging portion 300 of the edge gage 11. Release of the treadle now permits the spring 86 to urge the feed disk down yieldingly into engagement with the work piece. The feed disk 22 not only advances the work piece, but, because of its angular arrangement, also tends to hold the work piece in against the edge gage 11. As the work piece advances, the bevel 172 of the holddown 16 rides up over the leading edge of the work piece. The tool 10, because of its rapid rotation in the direction of feed, would tend, as soon as the work piece reaches it, to advance the work piece rapidly without performing any useful work upon it if it were not for the feed disk 22, which turns slowly and controls the feed of the work piece. The holding down of the work piece against the work table close to the locality of operation is important in assuring a smooth, uniform scarf. The holddown 16, however, serves not only to hold the work piece down firmly upon the work tables 12 and 14, but it also serves as a guard to protect the fingers of the operator from injury and to protect the tool 10 from damage. The holddown 16, moreover, serves as a dust hood to enable the dust and chips resulting from the operation to be drawn through the suction pipe 226. After the trailing edge of the work piece has passed the feed disk 22, the work piece would be speedily ejected by the tool 10 if it were not for the presser feet 168 and 170. As has already been pointed out in the foregoing description, the holddown 16 bears down upon the work piece with the combined force of the springs 86 and 192 after the work piece has passed the feed disk 22. This pressure causes the holddown 16 to exert a drag or a retarding effect upon the work piece which enables the tool 10 to perform a satisfactory scarfing operation all the way up to the trailing edge of the work piece. Even after the trailing edge has passed the presser foot 168, the work piece will still be under the influence of the presser foot 170, which bears down upon it with the full force of both springs. The lever 176 fits closely enough in the lug 174 to keep the presser feet 168 and 170 always at the same level. The holddown may, however, tilt about the fulcrum pin 182 to accommodate local variations in the surface of the work piece.

The tool 10, because of the cylindrical lands 27, is enabled to make a particularly smooth scarf upon the work piece. These lands not only aid in holding the work piece flat against the work table, but they also appear to have a polishing effect.

Having thus described my invention, what I claim as new and desire to secure by Letters Patent of the United States is:

1. A scarfing machine comprising a high-speed rotary scarfing tool driven in the direction of feed of a work piece, a work table, a driven feed disk frictionally engageable with the surface of the work piece in advance of the scarfing tool for controlling the feed of the work piece, a spring for pressing the feed disk down upon the work piece, a presser foot engageable with a portion of the work piece which has been fed past the feed disk, a spring urging said presser foot down on the work, and a connection between the feed disk and the presser foot for transferring the stress of the first-mentioned spring to the presser foot when the feed disk drops upon the passage out from under it of the trailing end of the work piece, thereby increasing the retarding effect of the presser foot upon the feed of the work piece.

2. A scarfing machine comprising a scarfing tool, an edge gage adjacent to said scarfing tool, a work table, a presser foot for holding down a work piece on said work table, a feed disk for controlling the feed to said scarfing tool, a guide over said work table for preventing excessive heightwise flapping of a long work piece, and an edge guide remote from said edge gage for cooperating with the edge gage in guiding a long work piece having a straight edge.

3. A scarfing machine comprising a work table, a rotary scarfing tool over said work table, a carrier for said scarfing tool, and an arcuate guide in which said carrier may be secured in a position of desired angular adjustment of the tool relatively to the work table, said guide having its axis of angular adjustment tangent to the periphery of the operating surface of the tool at an end of said operating surface and at the point on said end which is closest to the work table.

CHARLES G. BROSTROM.

REFERENCES CITED

The following references are of record in the file of this patent:

UNITED STATES PATENTS

| Number | Name | Date |
| --- | --- | --- |
| 521,077 | Barker | June 5, 1894 |
| 650,924 | Boynton | June 5, 1900 |
| 837,763 | Williams | Dec. 4, 1906 |
| 841,439 | Plue | Jan. 15, 1907 |
| 909,025 | Roussell | Jan. 5, 1909 |
| 1,079,032 | Solem | Nov. 18, 1913 |
| 2,170,687 | Johnson | Aug. 22, 1939 |
| 2,252,112 | Bailey | Aug. 12, 1941 |
| 2,296,836 | Brostrom | Sept. 29, 1942 |
| 2,349,162 | Gaskell et al. | May 16, 1944 |